M. WOZNY.
BALLOON VEHICLE.
APPLICATION FILED AUG. 7, 1917.
1,259,578.
Patented Mar. 19, 1918.
2 SHEETS—SHEET 2.
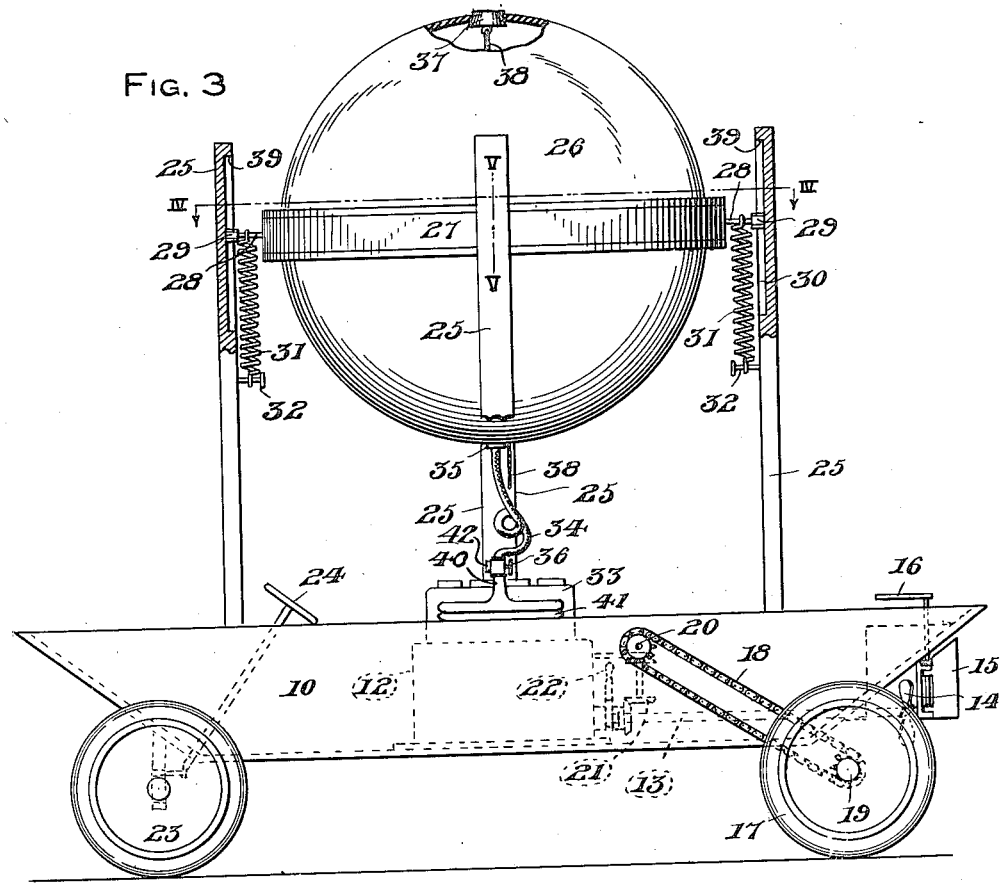
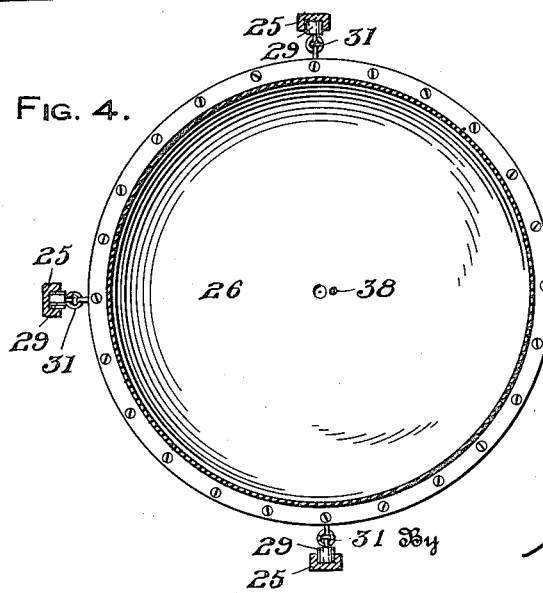
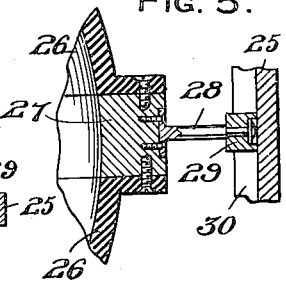
Inventor
M. Wozny
Attorney.

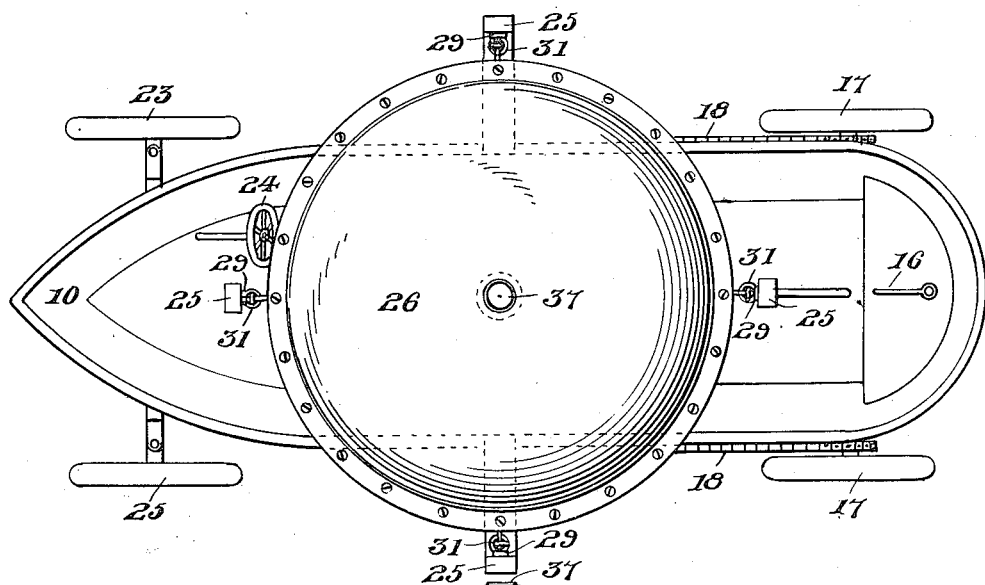

UNITED STATES PATENT OFFICE.

MITRO WOZNY, OF CLEVELAND, OHIO.

BALLOON-VEHICLE.

1,259,578.   Specification of Letters Patent.   Patented Mar. 19, 1918.

Application filed August 7, 1917. Serial No. 184,844.

*To all whom it may concern:*

Be it known that I, MITRO WOZNY, a subject of the Emperor of Austria, residing at Cleveland, in the county of Cuyahoga and State of Ohio, have invented certain new and useful Improvements in Balloon-Vehicles, of which the following is a specification.

This invention relates to certain new and useful improvements in balloon vehicles.

The primary object of the invention is the provision of a device for carrying either passengers or freight arranged for lessening the frictional contact incident to the traveling of the device by means of a member floating in the air and operatively connected thereto.

A further object of the device is the provision of a combined automobile and motor boat having a balloon attachment adapted for partially supporting the same whether traveling upon the land or in the water, suitable propelling means being arranged for the device.

A still further object of the invention is the provision of a land and water craft having a gas bag attachment for partially supporting the same, the propelling motor for the craft being adapted for supplying gas to the bag under suitable regulation.

With these general objects in view, the device consists in the novel combination and arrangement of parts hereinafter fully described and illustrated in the accompanying drawings, in which like reference characters designate corresponding parts throughout the several views.

In the drawings:—

Figure 1 is a top plan view of the device,

Fig. 2 is a rear elevation thereof,

Fig. 3 is a side elevation of the same with parts broken away,

Fig. 4 is a horizontal sectional view taken upon line IV—IV of Fig. 3, and

Fig. 5 is a slightly enlarged detail sectional view of one of the guiding means for the gas bag.

It will be understood that the present arrangement is adaptable for any kind of carrier such as an automobile, or a motor boat but the same is herein illustrated in connection with a combined vehicle and boat, having a boat-shaped body 10 arranged with a propelling motor 12 therein. When the device is employed as a boat, the power shaft 13 of the motor is employed for turning the propeller 14 a. the stern of the body 10 while a rudder 15 positioned adjacent thereto is employed for steering the boat, the rudder being operated by the tiller handle 16. When the device is used as an automobile, the rear traction wheels 17 thereof are operatively connected to the motor shaft 13 by means of sprocket chains 18 running from the axle 19 of the wheel 17 to a transverse shaft 20, the operative connection between the shafts 13 and 20 being effected by gearing 21 controlled by a clutch lever 22. The vehicle wheels 23 of the automobile are controlled by a steering wheel 24.

A plurality of uprightly extending posts 25 are carried by the body 11 for accommodating a vertically movable gas bag 26 therebetween. The gas bag is formed of an inflatable material such as rubber having a central ring 27 at its equator to which diametrically arranged stub shafts 28 are attached projecting outwardly and having rollers 29 upon their outer ends slidably arranged within slots 30 upon the inner sides of the post 25.

The shafts 28 are resiliently connected to the post 25 by means of springs 31 having their upper ends secured to the shafts 28 and the other lower ends secured to pins 32 carried by the post 25 beneath the level of the slots 30. The cylinders 33 of the motor 12 are connected by a pipe 34 and the exhaust manifold 41 with the inlet 35 of the gas bag 26 adjacent the bottom of the bag while the admission of gas to the bag is controlled by means of a valve 36. A closure plug or stopper 37 is arranged in the top of the bag 26 adapted to be opened when desired by means of a pull-cord 38.

It will be understood that when the vehicle is traveling over the land under the propelling power of the motor 12, the bag 26 may be filled to the desired extent with exhaust gas from the cylinders 33 so that the bag will rise for bringing the rollers 29 in contact with the shoulders 39 at the upper ends of the slots 30 and adjacent the tops of the post 25. It will be understood that the buoyancy of the bag 26 partially supports the vehicle so that the traction wheels 17 force the device over the ground lightly contacting the ground and substantially skimming thereover. When the device is in the water, it will be understood that the propeller 14 propels the device through the water while the body 11 only lightly rests upon the water by reason of the buoyancy of the gas bag 26. It will be apparent that if it is desired to rise above the surface of the land, or water, the bag 26 will be provided of sufficient size to elevate the device to the desired extent.

It is contemplated to connect the outlet 40 of the engine exhaust manifold 41 to the valve 36 and to engage the manifold 41 close to the cylinders 33 of the explosive motor 12 so as to heat the inflating gas, thereby assisting the buoyancy of the gas bag 26. The valve 36 may be opened for exhausting the products of combustion to the atmosphere through the port 42 when the generator is not in use.

A serviceable device is arranged for traveling over the water or land having a resilient connection with a gas bag for assisting in navigating the craft and it will be understood that when desired, the cord 38 may be pulled for removing the plug 37 for emptying the bag 26.

What I claim as new is:—

1. A device of the class described comprising a boat-shaped body, upright posts attached to the said body having grooves in their inner sides, a gas bag arranged between the said posts having a centrally arranged ring, radially projecting stub shafts carried by the said ring, rollers upon the ends of the said shafts freely arranged within the said grooves, spring connections between the said shafts and the posts at points below the said grooves.

2. A device of the class described comprising a boat-shaped body, upright posts attached to the said body having grooves in their inner sides, a gas bag arranged between the said posts having a centrally arranged ring, radially projecting stub shafts carried by the said ring, rollers upon the ends of the said shafts freely arranged within the said grooves, spring connections between the said shafts and the posts at points below the said grooves, a gas generator for the bag arranged therebeneath within the body, a connecting pipe between the generator and bag, a receiving valve within the said pipe, a closure plug for the bag and a pull-string for the plug extending to a point adjacent the said generator.

In testimony whereof I affix my signature.

MITRO WOZNY.